July 27, 1954 T. J. J. HOEK 2,684,891
METHOD FOR THE CONTINUOUS CRYSTALLIZATION
OF SOLIDS FROM THEIR SOLUTIONS
Filed Oct. 25, 1948
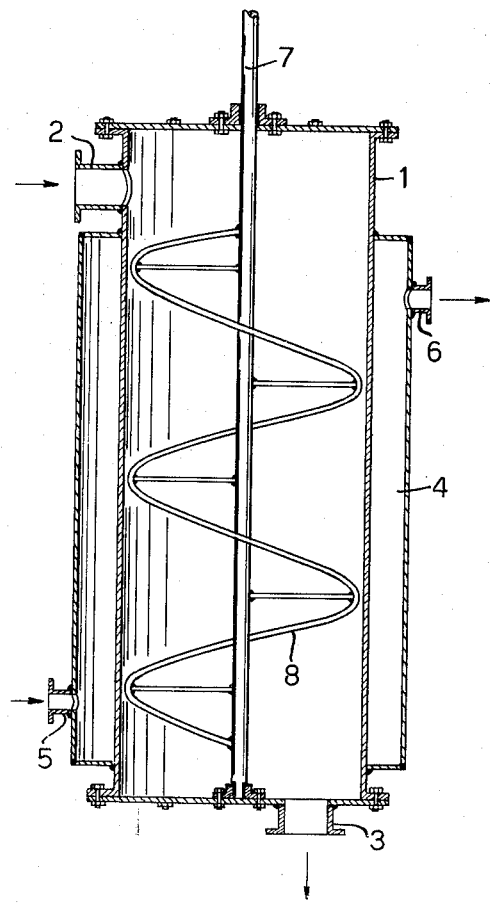
INVENTOR
Theodorus J. J. Hoek
By Cushman, Darby & Cushman
ATTORNEYS

UNITED STATES PATENT OFFICE 2,684,891

METHOD FOR THE CONTINUOUS CRYSTALLIZATION OF SOLIDS FROM THEIR SOLUTIONS

Theodorus Johannes Josephus Hoek, Geleen, Netherlands, assignor to De Directie van de Staatsmijnen in Limburg, Heerlen, Netherlands, acting for and on behalf of the State of the Netherlands Application October 25, 1948, Serial No. 56,467

1 Claim. (Cl. 23—295)

The invention relates to a method for the continuous crystallisation of solids from their solutions.

The crystallisation of solids from their solutions generally has to comply with two technical conditions. In the first place a relatively coarse crystalline product is required, to be separated, preferably in centrifuges, from the adhering mother-liquor; while secondly a method is wanted which can be operated in apparatus of a high specific capacity, viz. a device through which a large quantity of solution may pass per unit of volume and per unit of time.

The well-known discontinuous methods are operated by cooling a quantity of solution in air or through contact with a cooling surface, causing the heat to be only gradually eliminated. These methods comply with the first condition and yield a coarse crystalline product, but they do not comply with the second one. On account of the slow crystallisation a high daily production is only attained by using devices of considerable dimensions (crystallising pans or tubs) but of a low specific capacity.

In order to apply smaller devices, a continuous crystallising method has been tried, causing a continuous flow of solution to pass through the crystalliser.

It is a well-known fact that a rapid elimination of heat, viz. a rapid cooling of the solution, causes the solution to enter the so-called metastable supersaturated zone, in which the solid which is available for crystallisation per unit of time is not only deposited on the crystals, already present, but forms also a large quantiy of new crystal nuclei, so that a product is obtained consisting principally of very minute crystals.

For this reason a slow and gradual cooling of the solution has always been aimed at and the difference of temperature between the solution and its surroundings, resp. the cooling surface, should be small in order to prevent a spontaneous formation of nuclei or, at least, to reduce the same as much as possible.

German Patent No. 454,405 depicts a continuous recycle crystalliser in which the solution is cooled in such a way that a metastable supersaturated zone is not attained, with a supersaturated solution being pumped through a layer of crystals on which any solid available per unit of time is deposited.

According to British Patents Nos. 260,133, 260,691 and 261,085 a solution is cooled in crystallisers, the spontaneous formation of nuceli being avoided as much as possible.

In some cases special means have been provided in order to render an unexpected larger number of crystal nuclei inoffensive. Thus, in such cases, the fluid which contains crystals and crystal nuclei and which circulates in a recycle crystalliser can be heated in a certain section of the circuit outside of the proper crystallising space; in this way the formed nuclei and very minute crystals are dissolved again (German Patent No. 390,933; the Eissner crystalliser, vide E. Berl, Chem. Ingenieur-Technik 3, page 207, 1935).

Another prior art suggestion aims at fitting a heating-spiral inside the crystallising space in order to obtain the same result (British Patent No. 261,085), but from a point of view of heat economy that is not attractive.

It is a general opinion that a crystallising process should be effected slowly, that the heat should be gradually eliminated and that there should be only a slight difference of temperature between the cooling-wall and the solution. Therefore, prior continuously operating crystallisers have been provided with a highly extended cooling surface and with special circulating devices.

The above mentioned opinion has led to the general opinion that the use of complicated and expensive devices is necessary for crystallising continuously (compare e. g. the Netherlands Patent Nos. 28,406 and 41,410).

The present invention proved this opinion to be false and showed that a continuous crystallisation can be effected with a very quick elimination of heat, yet yielding a relatively coarse crystalline product and that this product is easily separated from the mother-liquor in a centrifuge and possesses still other fine properties.

According to the invention, hot concentrated solution is continuously passed through a bath which is only cooled at the wall and in which there are means to keep the wall clear of crystals; the heat is eliminated so quickly that more nuclei are formed per unit of time than crystals are discharged, the excess of nuclei being removed by bringing them in touch with the hotter parts of the fluid.

It appears to be possible to work this new method by means of a very simple appliance of relatively small dimensions and of a very high specific capacity. A cylindrical crystallising vessel is quite suitable which includes a cooling-jacket and a stirring device fitted with scrapers, which clean the cooling-wall.

A more complete understanding of this invention will be had by reference to the accompanying drawing, which constitutes a vertical cross sectional view of the preferred form of the apparatus for carrying out the process of this invention.

The apparatus consists of a cylindrical crystalliser 1 provided with an inlet 2 for the solution to be crystallised and on outlet 3 for the crystal slurry formed in the crystalliser. The crystalliser is surrounded by a cooling jacket 4 having an inlet 5 and an outlet 6 for circulation of cooling fluid therethrough. Extending vertically and centrally of the crystalliser 1 is a shaft 7 rotated by driving means (not shown) and which carries a helicoidal stirrer device 8 provided on the outer edge with a steel wire brush (not shown) for scraping the inner wall of the crystalliser.

The hot solution continuously enters at the top of the apparatus and the liquid which contains the crystals is continuously discharged at the bottom. The temperature of the fluid inside the crystalliser is maintained well below the crystallising temperature of the solution and heat is eliminated quickly, because the temperature of the coolant which circulates through the cooling-jacket is maintained well below the average temperature of the material in the crystalliser.

The movement of the stirrer brings the nuclei formed at the cooling-wall in touch with the hotter parts of the fluid and so causes them to dissolve. A helicoidal stirrer can be used since its movement hinders a rapid sinking of the coarser crystals and promotes the increase of crystals. The nuclei dissolve in the fluid which surrounds the coarser crystals. In this way a very quick crystallisation has proved to yield a relatively coarse crystalline product, which forms an excellent material for being centrifuged.

An engineer may easily determine the speed of stirring to be applied under special conditions.

If the stirring is not rapid enough, it appears that the nuclei which are formed at the wall have no sufficient opportunity of touching the hotter parts of the fluid and that the product contains an excess of minute material.

However, if the stirring is effected too quickly, the temperature practically will be the same in all places so that the nuclei have no opportunity of dissolving in a hotter part of the bath which results in a product which contains many minute crystals.

By varying the speed of stirring and by controlling the product simultaneously, the optimum speed of stirring under any particular conditions can be ascertained.

If required, the invention can be applied by a passage through more baths connected in series, as illustrated by the first of the following examples.

*Example 1*

This example relates to the crystallisation of anthracene from crude anthracene oil.

In this case the device consists of two cylindrical crystallisers connected in series, each having a diameter of 1 metre and a height of 2 metres and provided with a cooling-jacket and a heliocoidal stirrer with a scraper.

The hot anthracene oil (temperature 90° C.) enters at the top of the first crystalliser and the fluid which contains the crystals is discharged at the bottom and passes through a tube to the topside of the second crystalliser. The oil leaves the latter at the bottom and enters a storage vessel provided with a stirring device; and from this vessel it is conducted to a centrifuge.

The cooling surface of each crystalliser amounts to 4.1 m.$^2$; the water which flows through the cooling-jacket cools the oil in counterflow.

The average temperature of the oil in the first crystalliser amounts to 45° C. (the difference of temperature between the bottom and the top is about 3° C.). There is a rise in temperature of the cooling water from 17° C. (when entering the cooling-jacket) to 34° C. (when leaving the same).

In the second crystalliser the average temperature of the oil amounts to 26° C. (the difference of temperature between the bottom and the top is about 2° C.). The temperature of the cooling water inside the jacket rises from 13° C. to 17° C.

The stirring device in both crystallisers makes 20 revolutions per minute.

A quantity of 500 kg. crude anthracene oil per hour is used. The product from the centrifuge is relatively coarse-grained (up to 95% has a size of grain larger than 0.25 mm.), it contains 20% by weight of pure anthracene and a maximum percentage of oil of 10%.

In this way 1 ton of crude anthracene oil yields 210 kg. of crude anthracene and 790 kg. of centrifuged anthracene oil.

When comparing this method to the generally applied pan method for the preparation of crude anthracene, the great advantage of the new method is evident. The latter requires 24 cooling pans for operating with 30 tons of crude oil per day, each cooling pan having a bottom surface of 14 m.$^2$ and a volume of 10 m.$^3$.

Applying the above method required only two crystallisers of a volume of 3 m.$^3$ each and of a total bottom surface of 5 m.$^2$.

Besides, the new method yields a product of a better quality of a much lower percentage of oil and, therefore, of a much higher commercial value.

*Example 2*

When crystallising a certain quantity of calcium nitratetetrahydrate from a nitric solution of raw phosphate, the method of the invention is applied in a cylindrical crystalliser having a diameter of 1 metre and a height of 3 metres and which is provided with a cooling-jacket (cooling surface about 9 m.$^2$) and a stirring device with a helicoidal element and a scraper.

The stirring device makes 20 revolutions per minute.

In this way the heat could be transmitted at a coefficient of 300–400. The solution flows into the crystalliser at a temperature of 26° C.; the average temperature of the fluid inside the crystalliser amounts to 10° C. (a few degrees of difference between the bottom and the top). The temperature of the coolant in the jacket rises from —6° C. (when entering) to —3° C. (when leaving the jacket).

In this way 2100 kg. of solution per hour pass through the apparatus, the coefficient of the transmission of heat amounting to 300, but notwithstanding the quick elimination of heat an excellent product for centrifuging is obtained and the quite uniform size of grain of 100% is larger than 0.5 mm.

The method in accordance with the invention, illustrated by both examples, have proved to be applicable to other cases, in which crystallisation from a solution has to be effected by cooling and always a product was obtained of a quality equal or better than products obtained in the usual and more expensive devices, in which heat is eliminated at a slow rate.

The method was applied to the crystallisation of anthracene from crude anthracene oil, of naphthalene from crude naphthalene oil, to the recrystallisation of crude anthracene from centrifuged naphthalene oil, to the separation of ammonium chloride and of potassium ferrocyanide from their aqueous solutions, to the crystallisation of calcium nitrate from a nitric decomposing solution of raw phosphate; in all these cases excellent results were obtained.

The method does not yield good results, whenever an apparatus is employed, in which wall cooling is substituted by cooling through a cooling-spiral (British Patent No. 559,992). In that case the heat is removed too quickly, so that the cooling device will be covered by a solid crust of crystals after a short time and further quick removal of heat becomes impossible.

Moreover, the nuclei formed at the cooling-wall may be caused to contact the hotter parts of the fluid by means of some adequate movement of the fluid caused by some device other than a stirrer, but a stirrer is the preferred device.

The new method can be applied by using other well-known technical appliances, e. g. by using more crystallisers connected in series or by feeding back mother liquor in order to reduce the pasty thickness inside the crystalliser.

I claim:

A process for the crystallisation of a crystalline solute from a solution thereof comprising the steps of continuously introducing said solution into the upper end of a vertically disposed cylindrical crystallising chamber, abruptly cooling the periphery of said chamber to a temperature well below the temperature of said solution, whereby the peripheral zone of said chamber is cooled to a temperature low enough to cause formation of crystal nuclei of said solute therein, and below that of the central portion of said chamber, stirring the peripheral zone only of said chamber at a low rate while maintaining a material temperature differential between the peripheral and central zones of said chamber by reason of said abrupt cooling and the absence of major disturbance, and continuously withdrawing a slurry of coarse-grained crystals of said solute from the lower end of said chamber, the solution passing downwardly through said chamber and said stirring effecting periodic displacement of cooled solution from said peripheral zone inwardly toward the warmer central zone of said chamber and then back toward said peripheral zone, whereby some of the crystal nuclei formed in said peripheral zone dissolve in the warmer central zone while other crystal nuclei return to the peripheral zone to grow.

References Cited in the file of this patent

UNITED STATES PATENTS

| Number | Name | Date |
|---|---|---|
| 1,787,356 | Burke | Dec. 30, 1930 |
| 2,078,627 | Block et al. | Apr. 27, 1937 |
| 2,121,208 | Milligan | June 21, 1938 |
| 2,288,667 | Allen et al. | July 7, 1942 |